US006983217B2

(12) United States Patent
Moore

(10) Patent No.: US 6,983,217 B2
(45) Date of Patent: Jan. 3, 2006

(54) MAPPING TECHNIQUES

(75) Inventor: Mark Ramon Moore, Oxfordshire (GB)

(73) Assignee: AGCO, Ltd., Coventry (GB)

( * ) Notice: Subject to any disclaimer, the term of this patent is extended or adjusted under 35 U.S.C. 154(b) by 302 days.

(21) Appl. No.: 10/639,566

(22) Filed: Aug. 12, 2003

(65) Prior Publication Data
US 2005/0066738 A1 Mar. 31, 2005

Related U.S. Application Data

(63) Continuation of application No. PCT/GB02/00457, filed on Feb. 1, 2002, now abandoned.

(30) Foreign Application Priority Data

Feb. 13, 2001 (GB) .................................... 0103586

(51) Int. Cl.
*G01L 1/00* (2006.01)
(52) U.S. Cl. ........................................ 702/129; 701/50
(58) Field of Classification Search .................... 702/5, 702/129
See application file for complete search history.

(56) References Cited

U.S. PATENT DOCUMENTS 5,561,250 A    10/1996   Myers
5,902,343 A *  5/1999   Hale et al. ................... 701/50
5,970,800 A    10/1999  Gunneskov et al.
6,185,990 B1 * 2/2001   Missotten et al. ............. 73/73
6,525,276 B1 * 2/2003   Vellidus et al. ............. 177/136

FOREIGN PATENT DOCUMENTS

GB       2372105 A  *  2/2001

OTHER PUBLICATIONS

Bloom et al., "Precision Farming From Rockwell", Apr. 1996, IEEE 1996, pp. 1-5.*

* cited by examiner

*Primary Examiner*—Michael Nghiem
*Assistant Examiner*—Cindy D. Khuu
(74) *Attorney, Agent, or Firm*—Troutman Sanders LLP; Gerald R. Boss

(57) ABSTRACT

A method of establishing yield and moisture content maps involves the continuous recording of yield of moisture content of a harvested crop, as a harvesting machine traverses a field. The recorded yield or moisture content is associated with data from a positioning system, in order that a map of yield or moisture content across the field can be generated. The yield or moisture content is compared with a second measurement of yield or moisture content, and a correction factor is determined. The correction factor is applied to the first yield or moisture content data in order to produce a more accurate yield or moisture content map.

10 Claims, 2 Drawing Sheets

| Tank No. | Yield Sensor on Combine Harvester | Position | Actual Yield | Moisture Content % (Actual) | Moisture Content Sensor |
|---|---|---|---|---|---|
| 1 | 10 t/hr | x y | 9.0 | 14% | 14 |
| 2 | 9.5 t/hr | $x_1\ y_1$ | 9.1 | 13.5% | 14 |
| 3 | 9.9 t/hr | $x_2\ y_2$ | 9.0 | 12.5% | 13 |
| 4 | 8.2 t/hr | $x_3\ y_3$ | 8.4 | 10% | 12 |
| 5 | 8.3 t/hr | $x_4\ y_4$ | 8.5 | 10% | 9.5 |
| 6 | 9.4 t/hr | $x_5\ y_5$ | 8.6 | 10% | 13 |
| 7 | 10.2 t/hr | $x_6\ y_6$ | 8.7 | 10.5% | 13.1 |
| 8 | 10.5 t/hr | $x_7\ y_7$ | 8.7 | 10.7% | 13.2 |

MAPPING TECHNIQUES

This is a continuation of International Application PCT/GB02/00457, with an international filing date of Feb. 1, 2002, now abandoned which claims priority from the UK application No. GB0103586.4, with the filing date of Feb. 13, 2001.

FIELD OF THE INVENTION

This invention relates to yield maps, and in particular to improving the accuracy of such maps by correcting data for inaccuracies in yield and moisture content data.

BACKGROUND TO THE INVENTION

Precision or site specific farming describes a particular farming practice where inputs are varied according to need. In order to establish need, the farmer obtains or creates maps showing how different parameters vary in value across any particular field.

One type of map commonly used is the yield map. The data for yield maps is collected by the harvesting machine using yield meters. For example, WO96/38714 describes a yield meter which measures the flow of grain using electromagnetic waves. It is also known to measure yield by weighing each tank of grain harvested.

In order to provide data suitable for the production of a yield map, the harvesting machine on which the yield meter is mounted must be equipped with positioning equipment, thereby enabling yield to be associated with location. Data from the yield meter is then recorded at data recording points, and at each data recording point the position of the harvesting machine is also recorded. A yield map is then established by processing the raw data using yield mapping software.

Using the yield map, the farmer can then plan the inputs for the following year's crop. For example, where yield is low he may add more fertilizer, or upon investigation he may find that the low yield was associated with compaction, and he may elect to cultivate that particular are of the field to a greater depth that the other areas.

The accuracy of yield maps depends on the accuracy of the data collected. Clearly, the more accurate the yield map, the more valuable it is to the farmer as a management tool. There are numerous ways of increasing the accuracy of yield maps. The present invention proposes a convenient and cost effective method for establishing accurate yield maps.

It is known to apply a correction factor to a yield data set. However, the known method relies upon comparing the total yield for a field as measured on the harvesting machine with the total yield for the field as measured by a second weighing system, comparing the two and using the difference as the correction factor, i.e., the yield as weighed by the second weighing system is deemed to be the accurate measurement. The correction factor is then applied to each datum in the data set. This method assumes a constant error in the yield meter mounted on the harvesting machine. However, the error may well not be constant. For example, it has been noticed that when harvesting oily crops, the error in the yield meter on the harvesting machine increases throughout harvesting due to the build up of sticky crop residues in the body of the yield meter.

As well as measuring yield on a harvesting machine, it is also known to measure moisture content of the crop being harvested, for example on a combine harvester. U.S. Pat. No. 5,561,250 discloses a combined yield and moisture meter for use on a combine harvester.

However, the type of moisture meters used on combine harvesters are inaccurate due to the way moisture is measured. They rely on the capacitance effect, which effectively measures the moisture content on the surface of the grain. The surface moisture content does not necessarily equate to the moisture content in the grain kernel.

It is not common practice to map grain moisture content, even though a moisture meter may be present on the combine. Where a moisture meter is present on the combine harvester it is not known to adjust the yield recorded according to moisture content.

However, it is known that moisture content can vary within a field, and with the time of day. For example, in Brazil the moisture content of grain can fall from 14% to 8% and rise again to 14%. Without correcting for moisture content the yield map would show a lower yield where the moisture content fell, and an increased yield where the moisture content rose.

It is an object of the invention to provide a method, which allows inaccuracies in yield maps to be corrected.

A yield meter usually measures a parameter which is indicative of yield, rather than weighing the crop itself. In this specification the term "measuring yield using a yield meter" will be understood to encompass the yield meter either measuring a parameter indicative of yield, or weighing the crop itself.

SUMMARY OF THE INVENTION

The invention provides for providing an accurate yield or moisture content map. Crops are harvested from a cropped area using a harvesting machine having a yield monitor. A first data set comprising raw yield data is established by continuously recording yield and position data periodically at data points when the harvesting machine is in a cropped area. A second data set comprising moisture content data is also established by continuously recording moisture content and position data periodically at data points when the harvesting machine is in a cropped area. Yield, moisture content and position data are stored in a memory. Upon discharging harvested crop from the harvesting machine, the data sets are marked to indicate that crop harvested at certain data points has been discharged from the combine harvester, thereby creating a marked sub-set of discharged crop within the dataset. The yield values within the sub-set to are summed to generate the yield value of crop in the batch. The moisture content values within the sub-set are divided by the number of data points in the subset to generate the average moisture content for the crop in the batch. The batch of discharged crop is weighed on a batch weighing system to generate a second yield value for the batch of crop. The weight of the batch as indicated by the yield meter is compared with the weight of the batch as measured by the batch weighing system to determine the error between the two. A correction factor is determined based on the determined error. The correction factor is applied to the yield values recorded in the batch sub-set. This process is repeated across the cropped area to create a corrected yield dataset which is inputted into yield mapping software. Also the moisture content of the batch of discharged crop is determined using a second method for determining moisture content to generate a second moisture content value for the batch of crop. The moisture content of the batch as indicated by the combine moisture meter is compared with the moisture content of the batch as determined by the second method of determining moisture content and determining the error between the two. A correction factor based on the determined error is determined. The correction factor is applied to the moisture content values recorded in the batch sub-set. This process is repeated across the cropped area to create a corrected moisture content dataset which is inputted into the said mapping software. The desired moisture content is compared with the moisture content at each data point in the moisture content dataset to generate a dataset of the difference between the actual and desired moisture contents. The dataset of the differences between the actual and desired moisture contents is utilized in calculating a correction factor to apply to the yield data set. The yield at each data point in the yield dataset is multiplied by the correction factor, thereby generating a dataset of yield at said desired moisture content. This is utilized to generate a yield map.

BRIEF DESCRIPTION OF THE DRAWINGS

In the drawings which are for exemplary purposes.

DETAILED DESCRIPTION OF THE PREFERRED EMBODIMENTS

Figure 1:
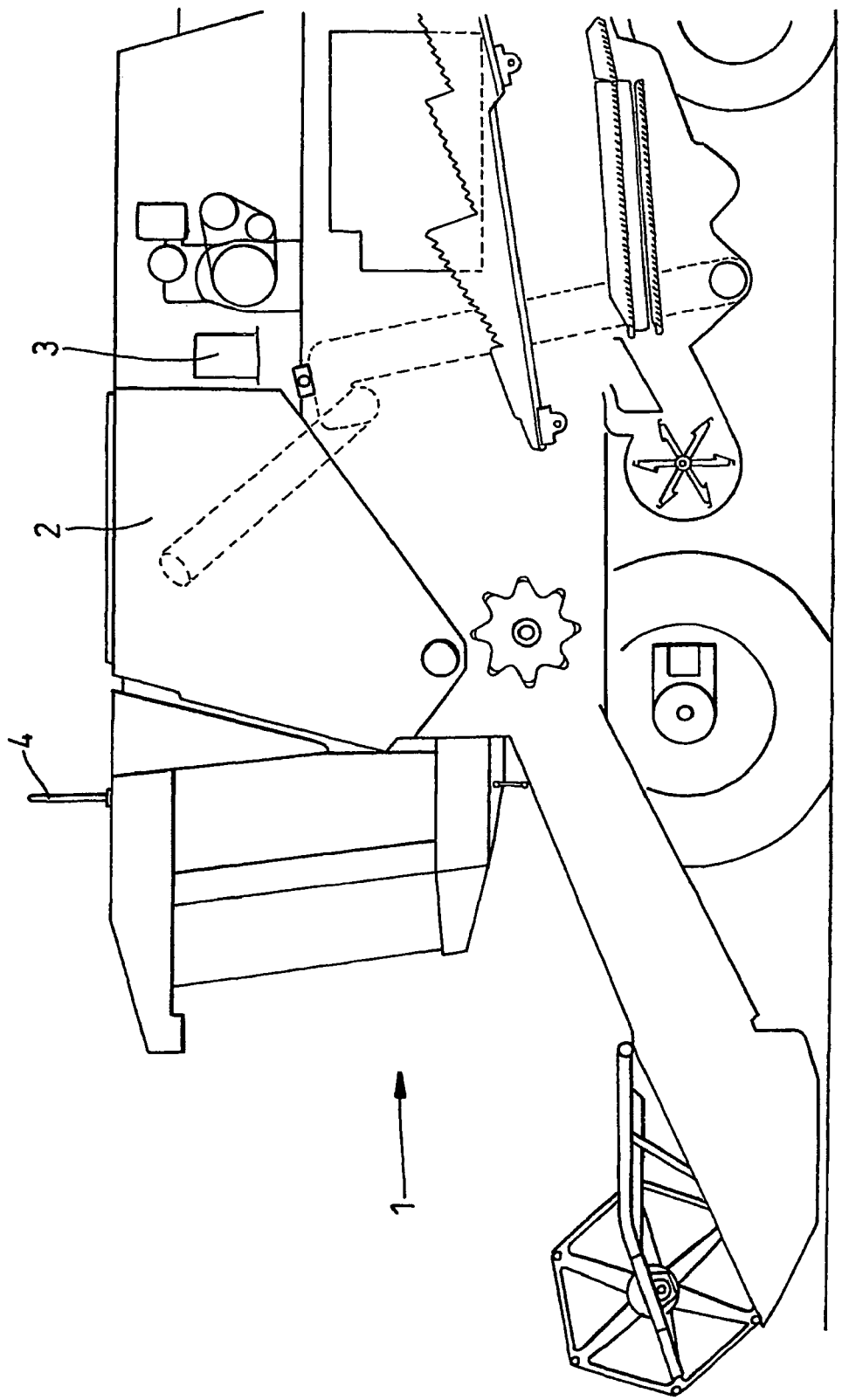
FIG. 1 is a side view of a combine harvester used in the method of the invention.

Referring now to FIG. 1, there is shown a combine harvester 1 comprising a grain tank 2, a yield monitor 3 and an antenna 4 for a GPS positioning system.

As the combine harvester 1 traverses a field, harvesting crop material in its path the grain is separated from straw and chaff in a manner familiar to those skilled in the art of combine harvesters. Grain passes through a yield monitor 3. The yield monitor 3 senses the amount of grain passing through and associates this with the distance travelled and cutter bar width to calculate the area harvested and hence a yield value is generated. One of the biggest sources of error is in the calculated area, due to the driver of the combine harvester finding it difficult to utilize the full width of the cutter bar when harvesting the standing crop.

The yield data is recorded in a data logging means, which in this case is part of the combine monitoring system sold under the name FIELDSTAR® available on combine harvesters sold under the Massey Ferguson® brand name. The combine monitoring system is connected to a GPS positioning system, and the position of the combine harvester 1 is recorded periodically as it traverses the field.

The yield and position data is stored in an electronic data storage means which may comprise a removable data storage card so that information recorded on the combine can be down loaded on to a PC for further use.

With appropriate software the yield and position data can be used to generate yield maps. An example of a yield map generated using the FIELDSTAR® system. As mentioned above, the yield map is used by the farmer to enable him to make decisions regarding crop inputs and it is therefore important that the information in the yield map is accurate.

Figures 2, 3:
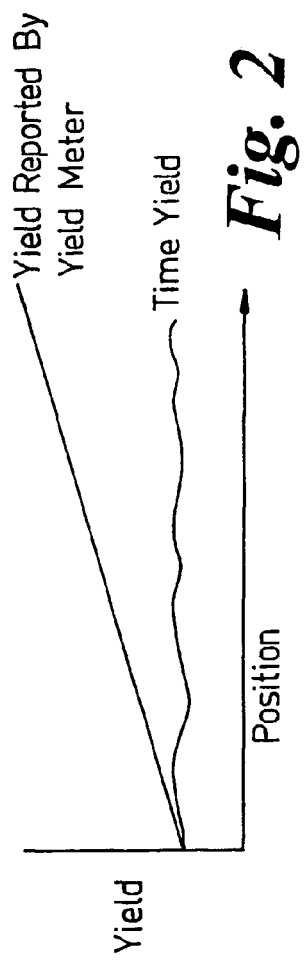
FIG. 2 is a graph showing true yield and recorded yield.
FIG. 3 is a table of data used in the method of the invention.

FIG. 3 is a graph showing true yield versus time and recorded yield versus time for some types of yield meter. The rising recorded yield is accounted for by harvested crop material sticking to the surfaces of the yield meter. This phenomenon is accentuated when an oily crop is being harvested. If such results were used in a yield map the farmer would base his inputs on an inaccurate yield measurement. This may result in wasted inputs or unfulfilled yield potential in the following crop.

It would therefore be advantageous for the farmer to be able to correct yield data so that decisions are based on correct information. Furthermore, if it is possible to correct yield data, there is less necessity to provide highly accurate yield metering equipment on the combine. It is possible to use cheaper, less accurate yield metering equipment.

During the harvesting process, the tank 2 of the combine harvester 1 fills with grain. When it is full its contents are discharged, usually into a trailer towed by a tractor, or directly into a lorry.

The method of the invention provides for the contents of the grain tank to be weighed a second time. This may be accomplished by weighing the trailer and its contents on a weigh bridge. Weigh bridges provide for very accurate measurement of weight. Alternatively, the grain tank of the combine may comprise suitably accurate weighing means.

The tank loads discharged into any one trailer can be logged and the position at which discharge occurred recorded. From this information, the various positions at which crop in the tank was harvested is known, and therefore when the grain is re-weighed over the weigh bridge, a correction factor can be established for the area where the grain in the trailer grew.

The weigh bridge yield information is entered into yield mapping software, such as the FIELDSTAR® software, the yield data established by the combine mounted yield monitor is corrected, and a yield map is generated in the usual way. This permits very accurate yield maps to be established.

It is common practice amongst some farmers to weigh each trailer load of grain as it comes off the combine. However, it is not known to use this information to correct the yield map on a load by load basis. Current application of correction factors relies on calculating the total error for the field and then applying the correction factor uniformly across the field. Misleading results can easily occur due to errors in the on-combine yield metering equipment, which might be inaccurate to plus or minus 10%.

The invention lies in recognizing that the measured weight of any one trailer load of grain can be associated with yield and position data recorded during harvesting, and therefore can be used to correct position specific yield information generated by the yield meter.

It is also known to measure moisture content of the crop as it is being harvested. The problem with such moisture measuring devices is that only the moisture on the surface of the grain is measured. It is possible to produce moisture content maps by recording the position of the combine on each occasion where moisture content is recorded. However, since the measurement of moisture content is inaccurate, the maps themselves will be inaccurate.

Another aspect of the invention provides a method for the correction of recorded moisture content. This is achieved by measuring the moisture content of each load of grain discharged from the grain tank using a second method of measuring moisture content which measures the moisture content inside the grain. The second method preferably includes the step of grinding the grain. By grinding the grain the moisture content of the inside of the grain can be established.

As well as inaccuracies in moisture measurement which occur in continuous measuring systems, moisture content maps can be further corrupted by changes in moisture content, particularly surface moisture content, which occur during the course of the day. As mentioned above, in some countries moisture content can vary by 6% during the course of a normal day.

A further aspect of the invention provides a method of correcting yield maps for moisture content. Yield data which has been corrected is then further enhanced by correcting for moisture content, i.e., actual yield at a specific moisture content. In this way the accuracy of the data is enhanced, as it its ease of use.

What is claimed is:

1. A method for establishing a yield map comprising the steps of:
   a) harvesting a crop from a cropped area using a harvesting machine having a yield monitor;
   b) establishing a first data set comprising raw yield data by continuously recording yield and position data periodically at data points when the harvesting machine is in a cropped area, said yield data being generated by the yield monitor;
   c) storing said yield and position data in a memory;
   d) upon discharging harvested crop from the harvesting machine, marking the data set to indicate that crop harvested at certain data points has been discharged from the combine harvester, thereby creating a marked sub-set of discharged crop within the dataset;
   e) summing the yield values within the sub-set to generate the yield value of crop in the batch;
   f) weighing the batch of discharged crop on a batch weighing system to generate a second yield value for the batch of crop;
   g) comparing the weight of the batch as indicated by the yield meter with the weight of the batch as measured by the batch weighing system and determining the error between the two;
   h) determining a correction factor based on the determined error;
   i) applying the correction factor to the yield values recorded in the batch sub-set;
   j) repeating the process across the cropped area to create a corrected yield dataset; and
   k) inputting the corrected yield dataset into yield mapping software, and generating a yield map from the corrected yield dataset.

2. A method according to claim 1, wherein the batch weighing systems comprises a weigh bridge, and wherein the weight of at least one batch of harvested crop is weighed by weighing a vehicle containing said at least one batch of harvested crop on the weigh bridge.

3. A method according to claim 1, wherein the batch weighing system comprises a vehicle including a body for receiving at least one batch of harvested crop, and means for weighing said body and batch of crop.

4. A method according to claim 3, wherein the body is a grain tank on the combine harvester.

5. A method according to claim 3, wherein the body is the body of a trailer or a lorry.

6. A method according to claim 1, wherein said harvesting machine is a combine harvester.

7. A method for establishing a moisture content map comprising the steps of:
   a) harvesting a crop from a cropped area using a harvesting machine having a moisture meter;
   b) establishing a first data set comprising moisture content data by continuously recording moisture content and position data periodically at data points when the harvesting machine is in a cropped area, said moisture content being generated by the moisture meter;
   c) storing said moisture content and position data in a memory;
   d) upon discharging harvested crop from the harvesting machine, marking the data set to indicate that crop harvested at certain data points has been discharged from the harvesting machine, thereby creating a marked sub-set of discharged crop within the dataset;
   e) summing the moisture content values within the sub-set and dividing by the number of data points in the subset to generate the average moisture content for the crop in the batch;
   f) determining the moisture content of the batch of discharged crop using a second method for determining moisture content to generate a second moisture content value for the batch of crop;
   g) comparing the moisture content of the batch as indicated by the combine moisture meter with the moisture content of the batch as determined by the second method of determining moisture content and determining the error between the two;
   h) determining a correction factor based on the determined error;
   i) applying the correction factor to the moisture content values recorded in the batch sub-set;
   j) repeating the process across the cropped area to create a corrected moisture content dataset; and
   k) inputting the corrected moisture content dataset into mapping software, and generating a moisture content map from the corrected moisture content dataset.

8. A method according to claim 7, wherein step (f) includes the step of grinding the grain.

9. A method according to claim 7, wherein said harvesting machine is a combine harvester.

10. A method for establishing a yield map comprising the steps of:
   a) harvesting a crop from a cropped area using a harvesting machine having a yield monitor;
   b) establishing a first data set comprising raw yield data by continuously recording yield and position data periodically at data points when the harvesting machine is in a cropped area, said yield data being generated by the yield monitor;
   c) establishing a first data set comprising moisture content data by continuously recording moisture content and position data periodically at data points when the harvesting machine is in a cropped area, said moisture content being generated by a moisture meter;
   d) storing said yield and position data in a memory;
   e) storing said moisture content and position data in a memory;
   f) upon discharging harvested crop from the harvesting machine, marking the data sets to indicate that crop harvested at certain data points has been discharged from the combine harvester, thereby creating a marked sub-set of discharged crop within the dataset;
   g) summing the yield values within the sub-set to generate the yield value of crop in the batch;
   h) summing the moisture content values within the sub-set and dividing by the number of data points in the subset to generate the average moisture content for the crop in the batch;
   i) weighing the batch of discharged crop on a batch weighing system to generate a second yield value for the batch of crop;

j) comparing the weight of the batch as indicated by the yield meter with the weight of the batch as measured by the batch weighing system and determining the error between the two;

k) determining a yield correction factor based on the determined error;

l) applying the yield correction factor to the yield values recorded in the batch sub-set;

m) repeating the process across the cropped area to create a corrected yield dataset;

n) inputting the corrected yield dataset into mapping software;

o) determining the moisture content of the batch of discharged crop using a second method for determining moisture content to generate a second moisture content value for the batch of crop;

p) comparing the moisture content of the batch as indicated by the combine moisture meter with the moisture content of the batch as determined by the second method of determining moisture content and determining the error between the two;

q) determining a moisture correction factor based on the determined error;

r) applying the moisture correction factor to the moisture content values recorded in the batch sub-set;

s) repeating the process across the cropped area to create a corrected moisture content dataset;

t) inputting the corrected moisture content data into said mapping software;

u) inputting a desired moisture content into the mapping software;

v) comparing the desired moisture content with the moisture content at each data point in the moisture content dataset and generating a dataset of the difference between the actual and desired moisture contents;

w) from the dataset generated in step (v), calculating a correction factor to apply to the yield data set;

x) multiplying the yield at each data point in the yield dataset by the correction factor, thereby generating a dataset of yield at said desired moisture content; and y) processing the dataset generated in step (x) to generate a yield map.

* * * * *